Figure 1:
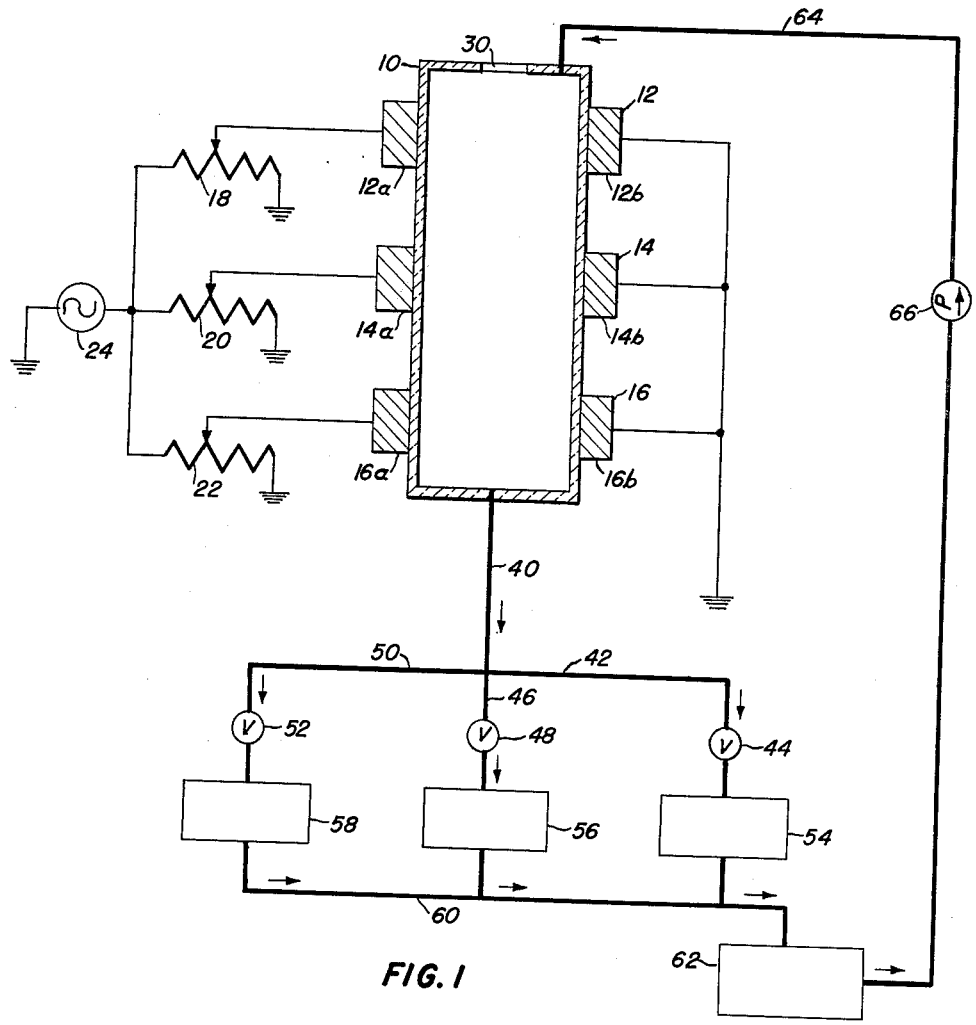

May 19, 1964  D. L. KLASS  3,133,876
APPARATUS AND METHOD FOR SEPARATING PARTICLES
Filed Oct. 12, 1961  2 Sheets-Sheet 1

INVENTOR.
DONALD L. KLASS
BY
Edward H. Gang
ATTORNEY

May 19, 1964     D. L. KLASS     3,133,876
APPARATUS AND METHOD FOR SEPARATING PARTICLES
Filed Oct. 12, 1961

2 Sheets-Sheet 2

INVENTOR.
DONALD L. KLASS
BY Edward H. Lang
ATTORNEY

United States Patent Office 3,133,876
Patented May 19, 1964

3,133,876
APPARATUS AND METHOD FOR SEPARATING PARTICLES
Donald L. Klass, Crystal Lake, Ill., assignor to The Pure Oil Company, Chicago, Ill., a corporation of Ohio
Filed Oct. 12, 1961, Ser. No. 144,661
8 Claims. (Cl. 209—1)

This invention relates to an apparatus and method for separating particles having differing velocities of sedimentation. More particularly, this invention relates to a method and apparatus for the separation of particles into discrete fractions, according to size, by sedimentation in an electrofluid medium of pre-adjusted viscosity.

The separation of particles in accordance with their velocity of sedimentation in a liquid medium is well known. The various parameters affecting velocity of sedimentation are related in accordance with the equation:

$$V = \frac{GPD^2}{1.8 \times 10^9 N}$$

where:

$V$ = the velocity of sedimentation in centimeters per second,
$G$ = gravitational constant (980),
$D$ = the diameter of the particles, in microns,
$N$ = the viscosity of the liquid medium in centipoises, and,
$P$ = the difference between the density of the particles and the density of the medium in g./cm.³.

From an inspection of the above equation, it is apparent that particles of a single material, having the same density, can be separated according to particle size; or particles of the same size, but differing in density, can be separated according to their densities by permitting the particles to settle through a liquid medium, the larger or more dense particles settling at a more rapid rate than the smaller or less dense particles, and being rapidly thereby separated. The application of centrifugal force to such systems augments the gravitational force and increases the velocity of movement, but this increase in velocity of movement applies to all particles in the system proportionately. In accordance with this invention, a method and apparatus have been devised based on the use of a fluid medium in which a variable viscosity-gradient can be established. Thus, the velocity of particles in varying zones of the systems will not be the same, depending upon the viscosity of the fluid medium in that zone. It has been found that zones of varying viscosity in the fluid medium can be conveniently provided by employing an electrofluid as the medium.

Electrofluids are liquid compositions comprising a non-conducting liquid medium, such as a refined white oil, a mass of minute particles, 10 microns in diameter or less, and usually a fluidizing agent is employed to maintain the residual viscosity of the mixture at a value not greatly above the viscosity of the vehicle. Such fluids respond to the application of an alternating electric field by displaying an instantaneous and reversible change in apparent viscosity. Many electrofluids display a change in apparent viscosity when exposed to either an alternating or a constant-potential (D.C.) electric field.

It is a primary object of this invention to provide a method and apparatus for classifying mixtures of particles into discrete fractions having differing velocities of sedimentation. Another object of this invention is to provide a method and apparatus for separating particles into discrete fractions in accordance with the velocity of sedimentation of the fractions wherein the viscosity of the fluid separation medium can be adjusted to provide zones in which discrete particle fractions will have a sedimentation velocity equal to the concurrent rate of flow of the separating medium, so that the particles comprising a fraction will remain stationary with respect to an outlet from which the particles and medium can be removed. Other objects of this invention will become apparent from the following description.

Figure 2:
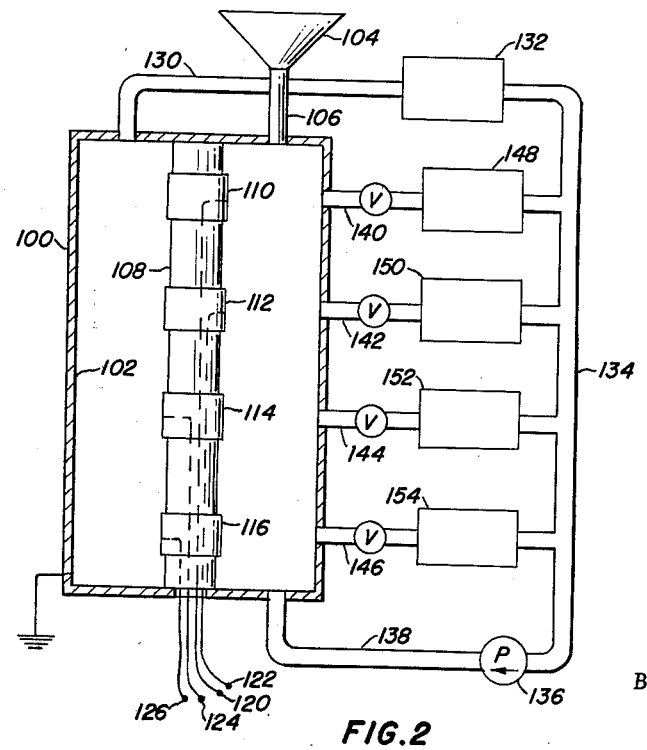

The invention is best described with reference to the drawings, of which,

FIGURE 1 is a schematic view of an apparatus constructed in accordance with this invention,
FIGURE 2 is an elevational view of an alternate embodiment of this invention,
FIGURES 3, 4, 5, and 6 are views showing alternate electrode arrangements for impressing electric fields which may be used in conjunction with the systems of FIGURES 1 and 2.

Referring to FIGURE 1, vertical cylindrical vessel 10, which is fabricated of a dielectric solid material, is adapted to enclose a cylindrical column of fluid. Vessel 10 is preferably fabricated of a material of high dielectric constant, such as barium titanate, but may be fabricated of other materials of lower dielectric constant, provided the materials are substantially non-conducting. Thus, glass, ebonite, porcelain, and quartz may be used. Vessel 10 is surrounded by spaced pairs of semi-cylindrical electrodes 12, 14, and 16. Electrodes 12a, 14a, and 16a are connected through potentiometers 18, 20, and 22 to a single-phase alternating-potential source 24. Electrodes 12b, 14b, and 16b are connected through ground to the other terminal of the potential source 24. The vessel 10 is provided with an opening 30 through which a mixture of solid particles to be separated can be introduced. At the lower end of vessel 10 is provided an outlet line 40 which branches to form lines 42, 46, and 50, which are controlled by valves 44, 48, and 52, respectively. Lines 42, 46, and 50 lead to filters 54, 56, and 58, respectively. A collection manifold 60 is provided to drain the liquid from filters 54, 56, and 58 to electrofluid retaining-tank 62. Line 64 and pump 66 are provided to return electrofluid from tank 62 to vessel 10. In operation, vessel 10 is filled with electrofluid, and the potentials applied across electrode pairs 12, 14, and 16 are adjusted to the desired values by means of potentiometers 18, 20, and 22. Thus, adjacent to the electrode pair 12 a zone of high viscosity is provided, adjacent to electrode pair 14 a zone of moderate viscosity is provided, and adjacent to electrodes 16 a zone of low viscosity is provided. A mixture of particles having differing velocities of sedimentation are then introduced into the vessel 10 through opening 30. The larger or more dense particles, having higher velocities of sedimentation, first settle through the zone of greater viscosity and enter the zone of moderate viscosity, where their rates of sedimentation are much higher. Thus, the particles having higher velocities of sedimentation may pass completely through the zone of intermediate viscosity, and enter the zone of lowest viscosity, before the smallest particles have left the first uppermost zone of highest viscosity and while particles of intermediate size have reached only the zone of intermediate viscosity.

At this point it is desirable to increase the potential applied at each zone to a high value, so that further sedimentation is reduced to a very slow rate. Valve 52 may then be opened and the fluid and sedimented particles occupying the zone adjacent to electrode 16 drained into filter 58. Valve 52 is then closed and valve 48 opened, draining the electrofluid and sedimented particles from zone 14 into filter 56. Similarly, the contents of the zone adjacent to electrodes 12 are drained into filter 54. Filters 54, 56, and 58 contain a filtering medium of appropriate size to separate the sedimenting particles from the electrofluid, which is returned by manifold 60 to tank 62. Filter screens in filters 54, 56, and 58 must have large enough openings to permit passage of the very small particles, 10 microns in diameter and smaller, which form part of the electrofluid. Since the particles which comprise the sample to be separated are substantially larger than 10 microns, say 50 microns or above in diameter, separation of the particles comprising the three fractions from the electrofluid is readily obtained.

The apparatus of FIGURE 2 is designed to operate using either A.C. or D.C. potential, and on a continuous, rather than on a batch, basis. Vessel 100 is cylindrical in form and is provided with an electrically conductive interior surface 102, which is grounded. The top of the vessel is provided with a hopper 104 and conduit 106 for introducing particles to be classified into vessel 100. Within the vessel is rod 108 upon which are supported electrodes 110, 112, 114, and 116. Rod 108 is fabricated of an electrically insulating material, such as Bakelite, and the electrodes, which are preferably in the form of rings pressed over the Bakelite rod, are supported in electrically insulated relationship. Conductors 120, 122, 124, and 126 connect to electrodes 110, 112, 114, and 116, respectively. Electrofluid outlet line 130 passes through filter 132 to collection manifold 134. The connection manifold 134 connects to pump 136 and return line 138 which terminates at the lower end of vessel 100. Valve-controlled lateral taps 140, 142, 144, and 146 connect to filters 148, 150, 152, and 154, respectively. Thus a continuous path of electrofluid circulation is provided through the system, the rate of circulation being controlled by pump 136. The flow of electrofluid is countercurrent to the direction of sedimentation of particles, under the influence of gravity, downward through vessel 100. In operation, the vessel and other components of the system are filled with electrofluid, and circulation at a desired low rate is provided by pump 136. The potential applied to electrodes 110, 112, 114, and 116 is adjusted to provide zones of varying viscosity along the length of the column of electrofluid contained within vessel 100. Thus a zone of reduced viscosity is provided adjacent to electrode 110, and the viscosity at the zones adjacent to electrodes 112, 114, and 116 are of increasing order of magnitude. The potential applied to electrode 110, for example, can be adjusted to provide a viscosity over a horizontal zone adjacent to electrode 110 such that particles of the kind introduced through hopper 104, having a particle size of 200 microns, or smaller, will have a velocity of sedimentation in the zone adjacent to electrode 110 no greater than the rate at which fluid is circulated upward through the vessel 100. The potential at electrode 112 can be adjusted so that particles having a size of 300 microns or smaller will have a velocity of sedimentation in the zone adjacent to electrode 112 no greater than the upward rate of flow of the electrofluid. The potential at electrodes 114 and 116 can be similarly adjusted to stop particles having diameters of 400 and 500 microns size, respectively. It is evident that the very fine introduced particles will be washed upward through line 130 and separated by filter 132. Particles approaching 100 microns in size will settle into the zone adjacent to electrode 110, where they will stagnate. The heavier particles will pass downward under the influence of gravity through the zone adjacent to electrode 110 and stagnate in the zones adjacent to electrodes 112, 114, and 116, depending upon their respective sizes. Thus a fraction containing particle sizes not greater than about 100 microns can be drawn off through valve-controlled conduit 140 to filter 148, likewise, electrofluid containing particle fractions not exceeding the other desired sizes can be drawn off through valve-controlled conduits 142, 144, and 146, and separated from the electrofluid in filters 150, 152, and 154, respectively, and then returned through manifold 134 and pump 136 to the bottom of vessel 100. In this manner, continuous classification of particles is achieved, and continuous flow of electrofluid is maintained. It is desirable that the electrodes 110, 112, etc., be spaced far enough apart to provide "dead" zones of reduced viscosity between the electrodes, so that the particles large enough to pass through the first zone will drop quickly to the zone adjacent to the next lower electrode, and there will be a reasonable space between each zone to permit more selective removal of the desired fractions to the various filters. The elements in each filter will be adapted to remove particles larger than the very small particulate material which comprises a portion of the electrofluid, but pass the electrofluid itself undisturbed. The apparatus of FIGURE 2 can be operated by applying either a D.C. or A.C. potential between each of the electrodes 110, 112, 114, and 116 and the grounded conductive surface 102 of vessel 100. Vessel 100 may be fabricated of a conductive material such as stainless steel, or it may be fabricated of a non-conductive material such as glass, with the interior surface 102 of the vessel coated with a conductive material, such as aluminum foil or a conductive coating.

Figure 3:
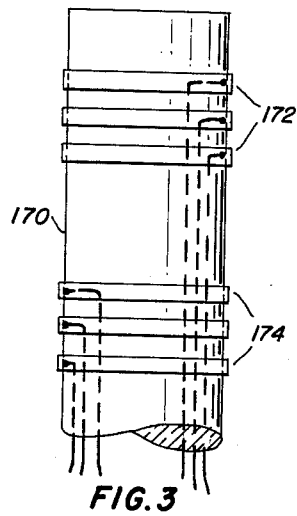

The device of FIGURE 1, wherein the vessel 10 is fabricated of a dielectric material, and the electrodes are disposed exteriorly of the dielectric material and not in contact with the electrofluid, is adapted for use only with an alternating potential. Various other electrode arrangements are shown in FIGURES 3, 4, 5, and 6. Referring to FIGURE 3, cylindrical rod 170 is fabricated of a non-conducting material, and is adapted for use in the vessel 100 of FIGURE 2 in place of the rod 108. Rod 170 is provided with a plurality of sets of electrodes, such as electrode sets 172 and 174. Each electrode set comprises three electrodes, and three lead wires are provided for each electrode set, one lead wire connecting to each electrode. Thus, three-phase potential can be applied to the electrodes of each set. Alternatively, each set could comprise only two electrodes, in which case single-phase potential would be employed. In either event, alternating potential must be used, and the potential is applied across the lead wires connecting to the electrodes of each set. Thus the electrodes of each set are operated independently, and can be connected to a potential source of any desired magnitude. In this embodiment, it is not necessary that the vessel 100 be provided with a conducting interior surface 102, since a potential is applied between the electrodes which comprise each electrode set, rather than between a central electrode and the surface of the vessel 100. However, more dramatic change in the viscosity of the electrofluid, for a given potential can be obtained by providing the vessel with a conductive interior surface, which may be grounded if desired.

Figure 4:
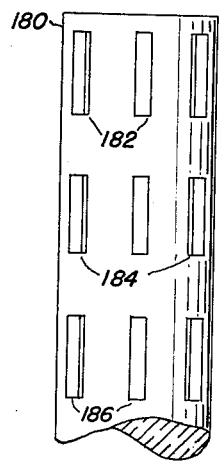
Figure 5:
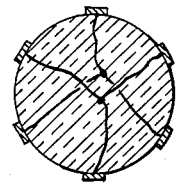

FIGURE 4 shows an alternate electrode arrangement, wherein the rod 180 is provided with a plurality of sets of electrodes, such as sets 182, 184 and 186. In this case, each electrode set comprises six electrodes, as shown in FIGURE 4. The six electrodes of each set may be connected to either a single-phase or three-phase power source, depending upon the number of electrodes connected in parallel. In FIGURE 5, a single-phase system is shown wherein three electrodes are connected in parallel to each side of the single-phase source. The assembly of FIGURE 3 may be used in conjunction with the apparatus of FIGURE 2, in place of rod 108. The interior surface of the vessel may be conductive or not, but it is preferred that it be conductive.

Figure 6:
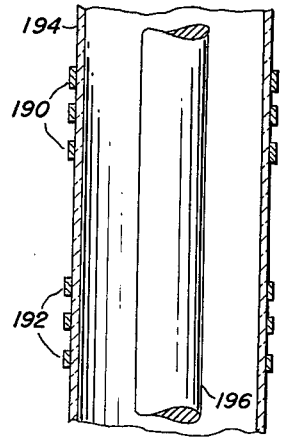

FIGURE 6 shows an alternate electrode arrangement, wherein the electrodes of electrode sets 190 and 192 are in the form of rings which encompass the wall of vessel 194, which wall is made of a dielectric material. The wall will preferably be thin, say 0.01 to 0.03 inch in thickness. The magnitude of the change of viscosity of the electrofluid within the vessel can be enhanced by providing an axial rod 196 having a conductive exterior surface within the vessel. The rod may simply be a solid bar or tube of steel or aluminum. No electrical connection need be made to the rod, but it may be grounded if desired. Where the electrode sets, such as electrode set 190, comprise three electrodes, three-phase potential may be employed. Alternatively, two electrodes may be used, and single-phase potential may be employed. It will be evident that numerous other electrode configurations can be devised. For example, the electrodes may be made very narrow and encompass the exterior of the vessel a number of times, in the form of a spiral. The same spiral configuration could be used in conjunction with rod 170 of FIGURE 4.

While the invention has been described with respect to downward sedimentation of particles, it will be evident that where the particle has a density less than that of the electrofluid, which ordinarily will seldom occur, the same separation technique and apparatus may be employed, except that the particles will be introduced from the bottom of the vessel and will sediment towards the top of the vessel. Where the separation is to occur as a continuous operation, the circulation of electrofluid would, in this case, be downward. It will be evident to those skilled in the art that the system can be modified to employ artificial gravity as the force causing migration of the particles, e.g., using centrifugal force to speed the separation process. The separation vessel can, for example, be made in the form of a disc, with the particles introduced at the center of the disc and removed at the disc periphery. In this case, the electrodes can be in the form of rings of increasing radii, so that ring-shaped zones of differing viscosity are provided within the vessel. It will at once be evident that the principle of operation of this invention can be cast in a wide variety of specific embodiments. Accordingly, as used in the specification and the appended claims, the phrase, "by force of gravity," must be understood to include the use of artificially induced gravitational forces, such as centrifugal force.

The particles separated in accordance with the method of this invention can be made of any material, provided an electrofluid is selected which has a density differing from that of the particles. The particles can be conductive or non-conductive, but where conductive it is preferred to use an electrode configuration wherein the electrodes are separated from the electrofluid by a high resistivity material, as in FIGURE 1. Thus, for example, particles of silica, glass, iron, aluminum, copper, mica, carborundum, etc. can be classified.

As a specific example of the use of the method of this invention, the apparatus of FIGURE 1 is filled with an electrofluid comprising 40% by volume of silica having a particle size lower than 10 microns, and 4% by volume of glycerol monooleate, the remainder being a refined white oil. A mixture of sand particles comprising one fraction having a size of about 1,000 microns, a second fraction having a size of about 5,000 microns, and a third fraction having a size of about 10,000 microns, is introduced into the top of vessel 10. The vessel is 10 centimeters long and is divided into three zones of three centimeters each, adjacent to each electrode set. No potential is applied to any of the electrodes, and it is observed that the rate of sedimentation of each fraction is in proportion to the size of the particles which comprise the fraction, that is, in the time required for the 1,000 micron fraction to descend one centimeter, the 5,000 micron fraction descends five centimeters, and the 10,000 micron fraction descends ten centimeters.

Potentials are now applied to the electrode sets to provide a viscosity of 100 centipoises in the three-centimeter zone adjacent to electrode set 12, a 50-centipoise viscosity in the three-centimeter zone adjacent to electrode set 14, and a 10-centipoise viscosity in the three centimeter zone adjacent to electrode set 16. It is evident that in the time required for the largest particles to traverse the first three-centimeter zone, the intermediate size particles will have descended only 1.5 centimeters, and the smallest particles will have descended only 0.3 centimeter. The heaviest particles are now ready to enter the second zone where viscosity is lower, and it is evident that in the time required for the intermediate-size-particle fraction to reach the bottom of the first zone, that is, to descend three centimeters, the heavier particle fraction will have descended through the second and third zones, of reduced viscosity, to the bottom of the vessel. In the time required for the intermediate-particle fraction to reach the bottom of the second zone, that is, to descend six centimeters, the lightest particle fraction will have descended only 0.75 centimeter and still be near the top of the first zone. The greater efficiency of separation using the method of this invention is apparent. At this point in the process, the potential applied to all of the electrode sets can be increased to provide a very high viscosity throughout the column and removal of the fractions can be achieved without disturbing the relationship and spacing of the various particle fractions.

As a second specific example of the method of this invention, the assembly of FIGURE 2 is filled with an electrofluid comprising 40% by weight of desiccant-grade silica having a particle size of under 10 microns, 4% by volume of glycerol monooleate, and 4% by volume of 1-hydroxyethyl, 2-heptadecyl imidazoline, the remainder being a refined white oil. Circulation of electrofluid through the system is maintained by pump 136 so that the upward rate of flow of electrofluid is one centimeter per minute. Sand particles having sizes ranging from 10,000 to 50,000 microns are to be separated into four fractions. The first fraction is to contain particles smaller than 20,000 microns, the second fraction particles smaller than 30,000 microns, the third fraction particles smaller than 40,000 microns, and the fourth fraction particles smaller than 50,000 microns. So that convenient numbers may be used in the example, it will be assumed that the density difference between the electrofluid and the sand is such that particles having a diameter of 20,000 microns will descend at a rate of one centimeter per minute, where the viscosity of the electrofluid is 20 centipoises. Thus a potential is applied by means of conductor 120 to electrode 110 so that a viscosity of 20 centipoises is maintained in the zone adjacent to electrode 110. Therefore, in this zone, the rate of sedimentation of 20,000-micron-diameter particles will be equal to the upward rate of flow of the electrofluid, and particles of this size will remain static in the zone, and will not penetrate the zone. Particles larger than 20,000 microns will descend through the zone of 20-centipoise viscosity. The potential applied to electrode 112 is adjusted to provide a viscosity of 30 centipoises, the potential at electrode 114 is adjusted to provide a viscosity of 40 centipoises, and the potential applied to electrode 116 is adjusted to provide a viscosity of 50 centipoises. It will be evident that particles having sizes less than 20,000 microns will come to equilibrium in the zone of the vessel above electrode 110, particles of sizes greater than 20,000 microns but smaller than 30,000 microns will come to equilibrium in the portion of the vessel between the electrodes 110 and 112, while particles having a size range of 30,000 to 40,000 microns will come to equilibrium in the portion of the vessel between electrodes 112 and 114, and so forth downward through the vessel. Particles of any desired fraction may be slowly removed through the lateral, valve-controlled conduits to the filters while the separation is in process, but it is preferred to withdraw no particles until a sufficient quantity of feed has been separated to saturate one of the zones. At this point, introduction of particles is terminated, and valve-controlled conduit 140 is opened to withdraw the fraction in the zone adjacent to electrode 110. Then this conduit is closed and conduit 142 is opened to withdraw the fraction in the zone adjacent to electrode 112, etc., downward through the column. After each fraction has been removed, feed is again introduced to the top of the vessel and the process repeated through as many cycles as may be desired. The electrofluid displays a change in viscosity only while it is under the influence of an applied field, and as the electrofluid moves from the field of one zone to the field of another zone, the viscosity of the electrofluid changes. When the electrofluid leaves the top of the vessel, it returns to its residual viscosity which will be some low value determined by the nature of the materials from which the electrofluid is formulated. The electrofluids themselves are well known in the art, and comprise no part of the instant invention.

The embodiments of the invention in which an exclusive property or privilege is claimed are defined as follows:

1. In the classification of a mixture of particles into a plurality of discrete fractions having uniform velocities of sedimentation by moving said particles through a fluid medium by force of gravity, the improvement comprising employing an electrofluid as said medium and varying the viscosity of said medium in a plurality of zones along the course of movement of said particles by applying electric fields of differing magnitudes to said medium at said zones, said electric fields being applied by applying electric potential between electrically conductive materials exposed to said medium.

2. A method of classifying a mixture of particles into a plurality of discrete fractions having different velocities of sedimentation comprising maintaining a vertical column of electrofluid, applying electric fields of differing magnitudes at a plurality of zones along the length of said column, introducing a mixture of particles having a density differing from that of said electrofluid at one end of said column and removing segments of said column containing discrete fractions of said particles from the other end of said column, flowing the electrofluid in a direction countercurrent to the direction of particle sedimentation, the applied fields being of least magnitude at the zone at the end of said column where the particles are introduced, and increasing in magnitude along the length of the column, the magnitude of the field at each zone being adjusted so that the sedimentation rate of one said fraction in said zone equals the rate of flow of said electrofluid, and removing from the zones electrofluid containing said discrete fractions.

3. A method of classifying a mixture of particles into a plurality of discrete fractions having different velocities of sedimentation comprising upwardly flowing an electrofluid column of substantially uniform cross-section and having a density less than that of said particles, applying electric fields of differing magnitudes at a plurality of zones along the length of said column, the applied fields being of least magnitude at the downstream end thereof, and increasing in magnitude along the length of the column, the magnitude of the field at each zone being adjusted so that the sedimentation rate of one said fraction in said zone equals the rate of flow of said electrofluid, introducing said mixture into said column at the downstream end thereof, removing from each of the zones segments of said column containing a discrete fraction, removing from each segment the discrete fraction contained therein, and introducing the segments from which said discrete fractions have been removed into the bottom of said column.

4. A method in accordance with claim 3 in which said electric fields are applied by applying electric potential between electrically conductive materials exposed to said medium.

5. In the classification of a mixture of particles into a plurality of discrete fractions having uniform velocities of sedimentation by moving said particles through a fluid medium by force of gravity, the improvement comprising employing an electrofluid as said medium, flowing said medium in a direction countercurrent to that of the movement of said particles while varying the viscosities of said medium in a plurality of zones along the course of movement of said particles by applying electric fields of differing magnitudes to said medium at said zones, the magnitudes of the applied fields being adjusted to provide zones in which the velocity of sedimentation of particles of a fraction equals the velocity of flow of the medium.

6. An apparatus for classifying a mixture of particles into a plurality of discrete fractions of uniform sedimentation rate comprising a vertical vessel of substantially uniform cross-section adapted to contain a column of electrofluid, said vessel having an electrically conductive interior surface and a plurality of valve-controlled outlets along the length thereof for withdrawing electrofluid therefrom, means for introducing said mixture into the top of said vessel, means for continuously introducing an electrofluid into the bottom of said vessel, a rod fabricated of an electrically non-conductive material extending axially of said surface within said vessel, a plurality of electrodes supported in electrically spaced relationship along the length of said rod, and means for applying electric potential between said electrodes and said surface.

7. An apparatus for classifying a mixture of particles into a plurality of discrete fractions of uniform sedimentation rate comprising a vessel adapted to contain a vertical column of electrofluid, said vessel having a cylindrical interior surface fabricated of an electrically conductive material, a first opening for introducing said particles adjacent to one end of said column and a second opening for removing electrofluid adjacent to the other end of said column, a rod extending axially of said surface within said vessel, a plurality of electrodes encompassing said rod supported in electrically spaced relationship along the length thereof, and means for applying electric potential between said electrodes and said interior surface.

8. An apparatus for classifying a mixture of particles into a plurality of discrete fractions of uniform sedimentation rate comprising a vessel adapted to contain a vertical column of electrofluid, said vessel having a cylindrical interior surface, a first opening for introducing said particles adjacent to one end of said column and a second opening for removing electrofluid adjacent to the other end of said column, a rod disposed axially of said surface within said vessel, a plurality of electrode sets supported by said rod in electrically insulated relationship, said sets being spaced axially along said rod, and means for applying electric potential between the electrodes of each said set.

References Cited in the file of this patent

UNITED STATES PATENTS

| 558,213 | Shedlock | Apr. 14, 1896 |
| 2,563,332 | Hebbard | Aug. 7, 1951 |
| 2,661,596 | Winslow | Dec. 8, 1953 |
| 2,902,153 | Green | Sept. 1, 1959 |

OTHER REFERENCES

Journal of Applied Physics, W. M. Winslow, "Induced Fibration of Suspensions," volume 20, December 1949, pages 1137–1140.

Tele-Tech, "Dielectric and Semiconductive Suspensions," September 1952, pages 56, 57 and 135.

Electrical Manufacturing, volume 63, page 11, "Electrofluids for Power Transmission," February 1959.